(12) United States Patent
Davis et al.

(10) Patent No.: US 8,672,114 B2
(45) Date of Patent: Mar. 18, 2014

(54) RELEASE BEARING ASSEMBLY

(75) Inventors: Chad Louis Davis, Garrett, IN (US); Mahesh Shashidhar Nesari, Charlotte, NC (US); Daniel Vern Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 342 days.

(21) Appl. No.: 13/066,647

(22) Filed: Apr. 20, 2011

(65) Prior Publication Data
US 2011/0253500 A1   Oct. 20, 2011

Related U.S. Application Data

(63) Continuation-in-part of application No. 12/323,891, filed on Nov. 26, 2008, now Pat. No. 8,087,507, which is a continuation-in-part of application No. 11/708,249, filed on Feb. 20, 2007, now Pat. No. 7,712,595.

(60) Provisional application No. 61/024,633, filed on Jan. 30, 2008, provisional application No. 61/326,343, filed on Apr. 21, 2010.

(51) Int. Cl.
*F16D 23/14* (2006.01)
*F16D 13/74* (2006.01)

(52) U.S. Cl.
USPC ............... 192/98; 192/110 B; 192/113.5

(58) Field of Classification Search
USPC ............ 192/113.32, 113.5; 184/5.1; 384/606
See application file for complete search history.

(56) References Cited

U.S. PATENT DOCUMENTS

| | | | | |
|---|---|---|---|---|
| 2,387,602 A | * | 10/1945 | Murden | 384/606 |
| 3,903,992 A | * | 9/1975 | Chivukula et al. | 184/5.1 |
| 4,204,720 A | * | 5/1980 | Otani | 192/98 |
| 5,687,826 A | * | 11/1997 | Kinoshita et al. | 192/113.32 |
| 7,712,595 B2 | | 5/2010 | McCutcheon et al. | |
| 8,087,507 B2 | | 1/2012 | Geiger et al. | |
| 8,534,926 B2 | * | 9/2013 | Suzuki et al. | 192/98 |
| 2008/0196993 A1 | * | 8/2008 | McCutcheon et al. | 192/98 |
| 2009/0071790 A1 | * | 3/2009 | Geiger et al. | 192/98 |

FOREIGN PATENT DOCUMENTS

WO   WO 2009/145216 A1 * 12/2009

* cited by examiner

*Primary Examiner* — Rodney Bonck
(74) *Attorney, Agent, or Firm* — Warn Partners, P.C.

(57) ABSTRACT

A release bearing assembly for an automotive clutch connecting an engine with a transmission is provided. The release bearing assembly can have a front slinger with a main body with a generally radial planar portion that at least partially covers an annular spacing between the bearing inner and outer races of the release bearing assembly. A rear slinger is provided which contacts an outer race of the bearing and forms an annular groove portion adjacent the annular spacing between the inner and outer races.

16 Claims, 5 Drawing Sheets

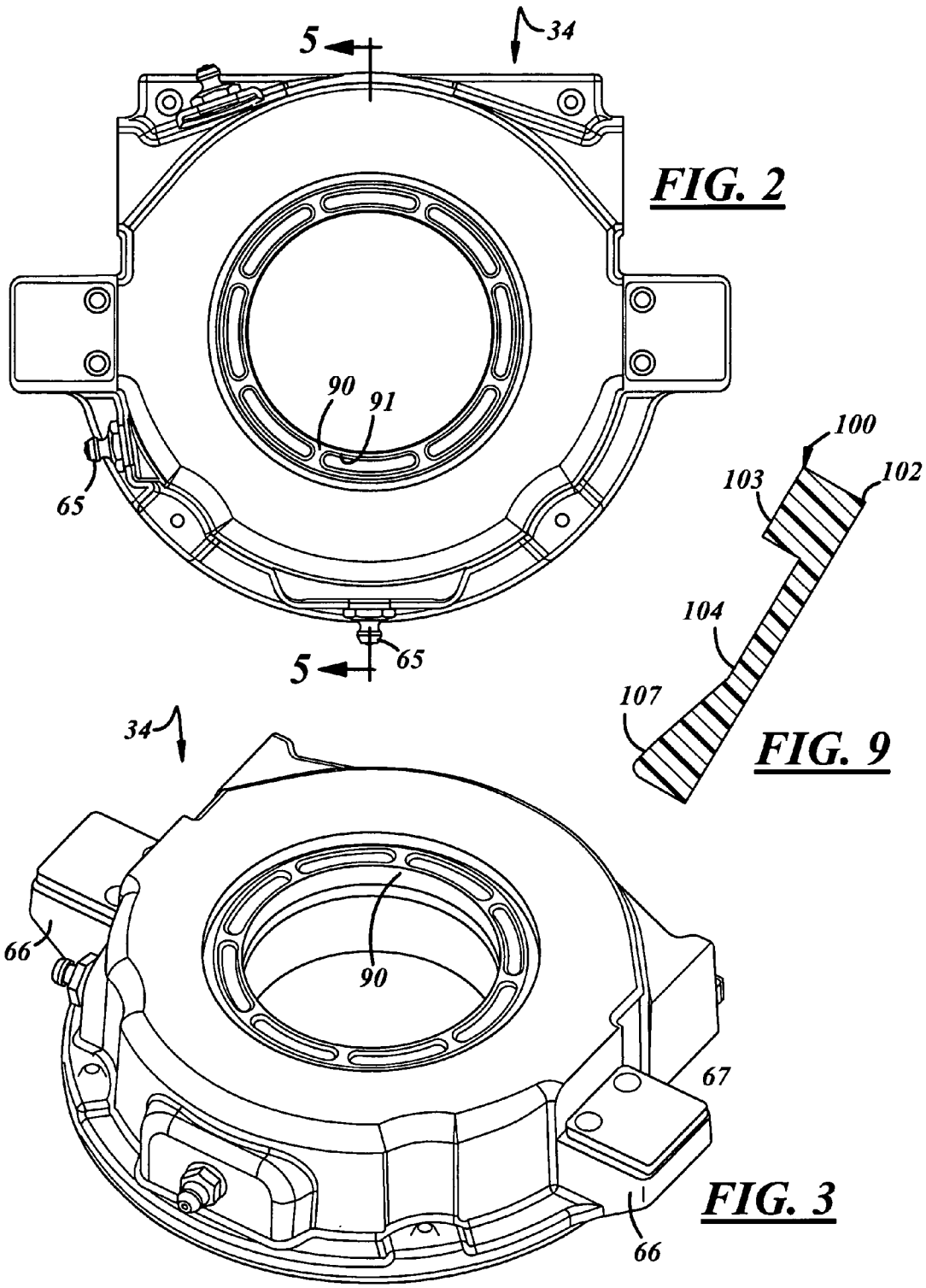

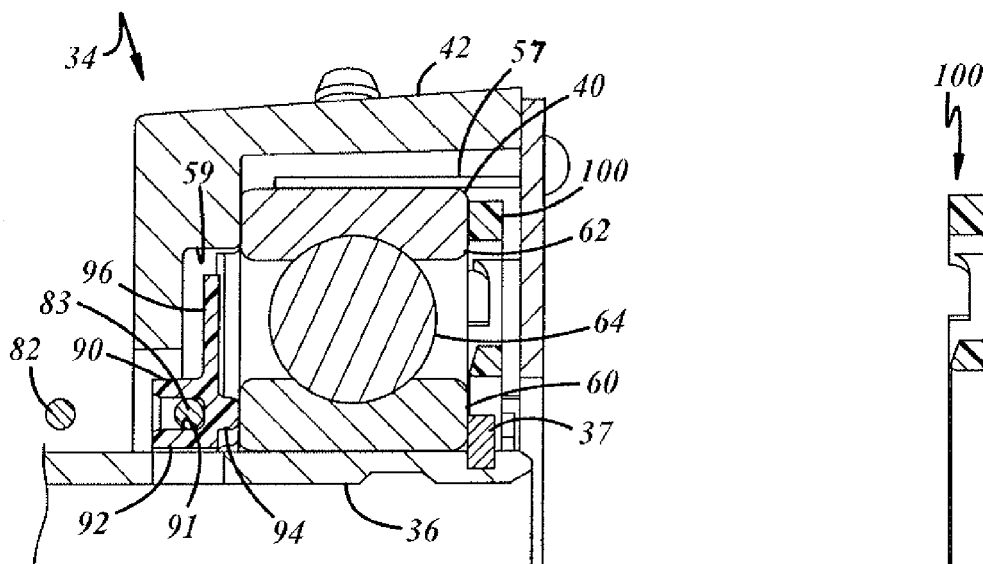
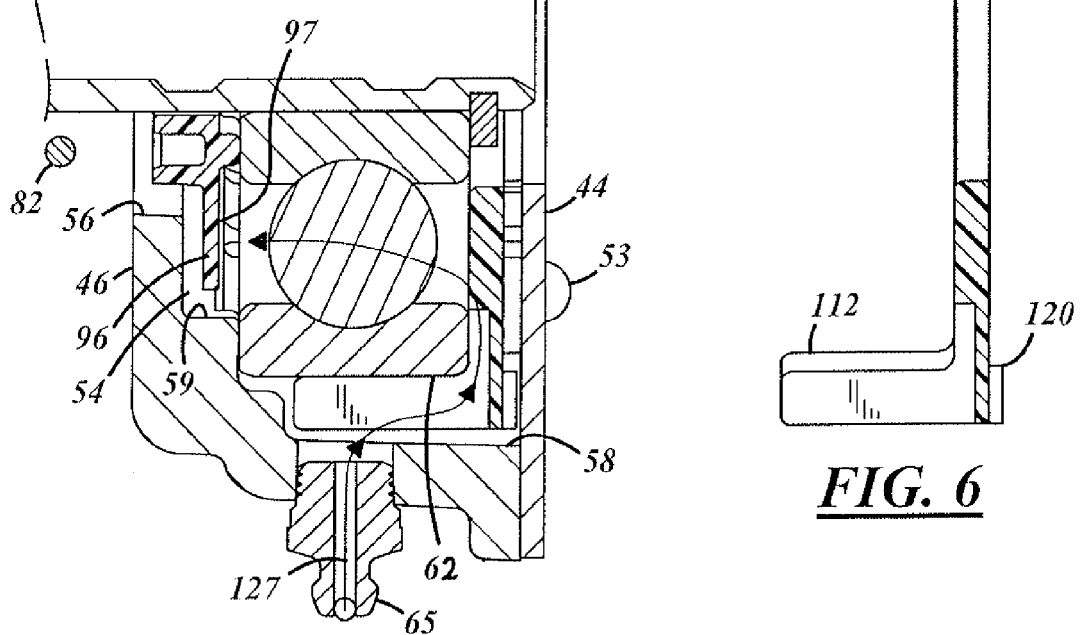
FIG. 5
FIG. 6

RELEASE BEARING ASSEMBLY

RELATED APPLICATIONS

The present application is a continuation-in-part of U.S. patent application Ser. No. 12/323,891, filed Nov. 26, 2008, which claims priority to U.S. Provisional Patent Application Ser. No. 61/024,633, filed Jan. 30, 2008, which is a continuation-in-part of U.S. patent application Ser. No. 11/708,249, filed Feb. 20, 2007 (issued U.S. Pat. No. 7,712,595, issued May 11, 2010). The present application additionally claims priority to U.S. Provisional Patent Application Ser. No. 61/326,343, filed Apr. 21, 2010. The disclosures of all related applications are incorporated herein by reference.

FIELD OF THE INVENTION

The present invention relates to improvements in clutch systems and clutch release bearing assemblies. More particularly, this invention relates to sealing systems for release bearings.

BACKGROUND OF THE INVENTION

It is desired to provide a release bearing assembly which is resistant to wear and effective at both keeping debris out of a cavity in which a roller bearing is disposed and retaining grease within the cavity.

SUMMARY OF THE INVENTION

In one preferred embodiment, the claimed release bearing assembly provides an improved means that is resistant to wear and effective at both keeping debris out of a cavity in which a roller bearing is disposed and retaining grease within the cavity. Such a release bearing assembly has a bearing housing with front and rear openings for receipt of an input shaft of a transmission. The bearing housing has a body mounting at least one grease fitting. The bearing housing has a generally radially inward extending flange intersected by the front opening. A bearing is provided with radially spaced apart inner and outer races. The outer race of the bearing is engaged by an interior of the housing in a non-rotative manner. A front slinger is provided having a first portion bordering an outer periphery of the bearing front opening and a second portion at least partially covering an annular spacing between the bearing inner and outer races. A rear slinger is provided contacting the outer race and forming an annular groove portion adjacent the annular spacing of the inner and outer races. The rear slinger can have reservoirs in the groove portion for storage of grease. A backer plate enclosing the rear slinger within the bearing housing can also be provided.

BRIEF DESCRIPTION OF DRAWINGS

FIG. 2 is a front elevational view of a release bearing assembly according to the present invention;

FIG. 3 is a front perspective view of the release bearing assembly shown in FIG. 2;

FIG. 5 is a sectional view of the release bearing assembly taken along lines 5-5 of FIG. 2 with portions of a retainer sleeve as shown in FIG. 1 added on for clarity of illustration;

FIG. 6 is a sectional view of the rear slinger utilized in the release bearing assembly shown in FIG. 5;

FIG. 9 is a sectional view of the rear slinger taken along lines 9-9 of FIG. 7.

DETAILED DESCRIPTION OF A PREFERRED EMBODIMENT

Figure 1:
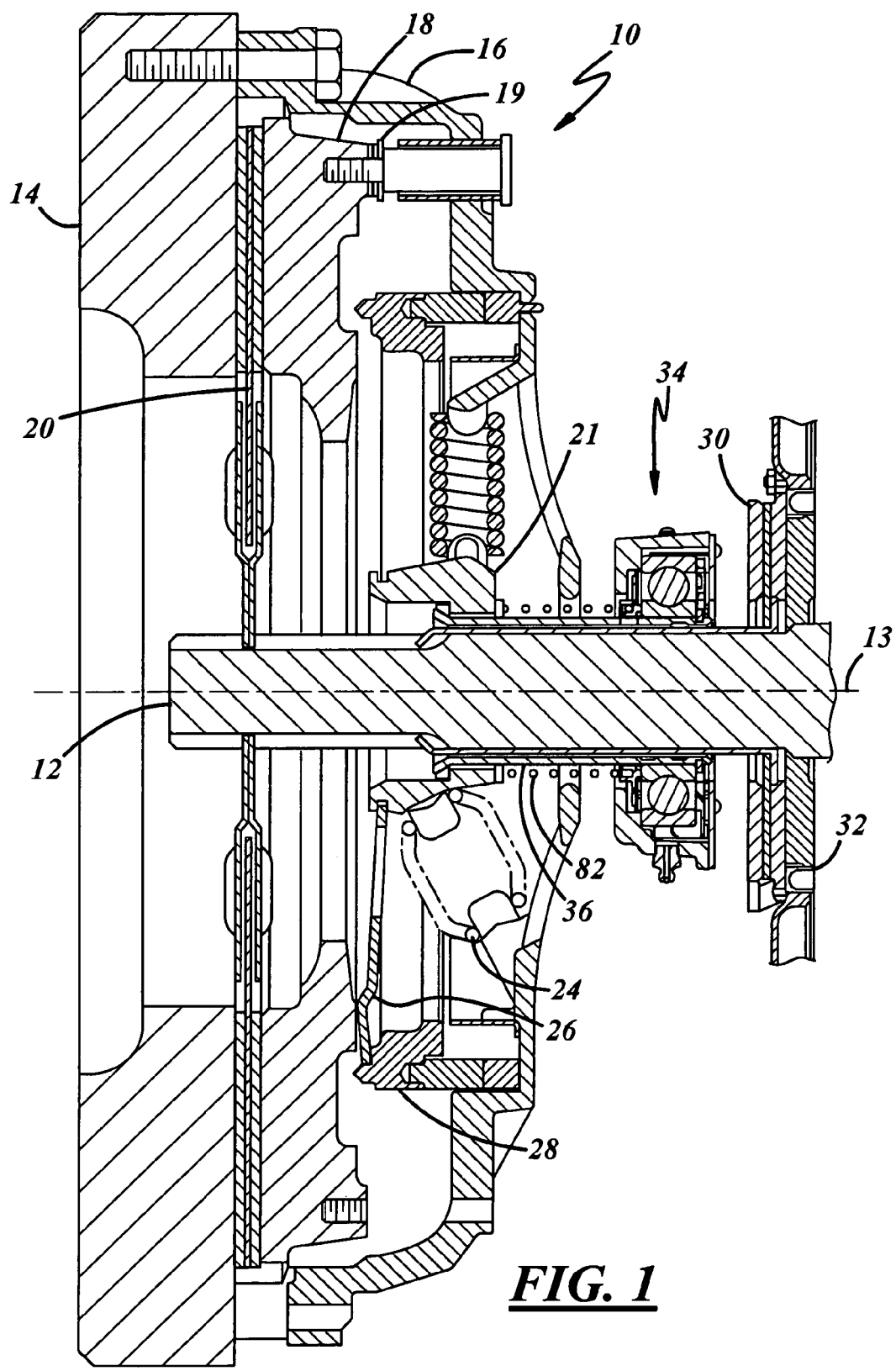
FIG. 1 is a sectional side view of a clutch employing a first embodiment of the inventive release bearing assembly.
Figure 4:
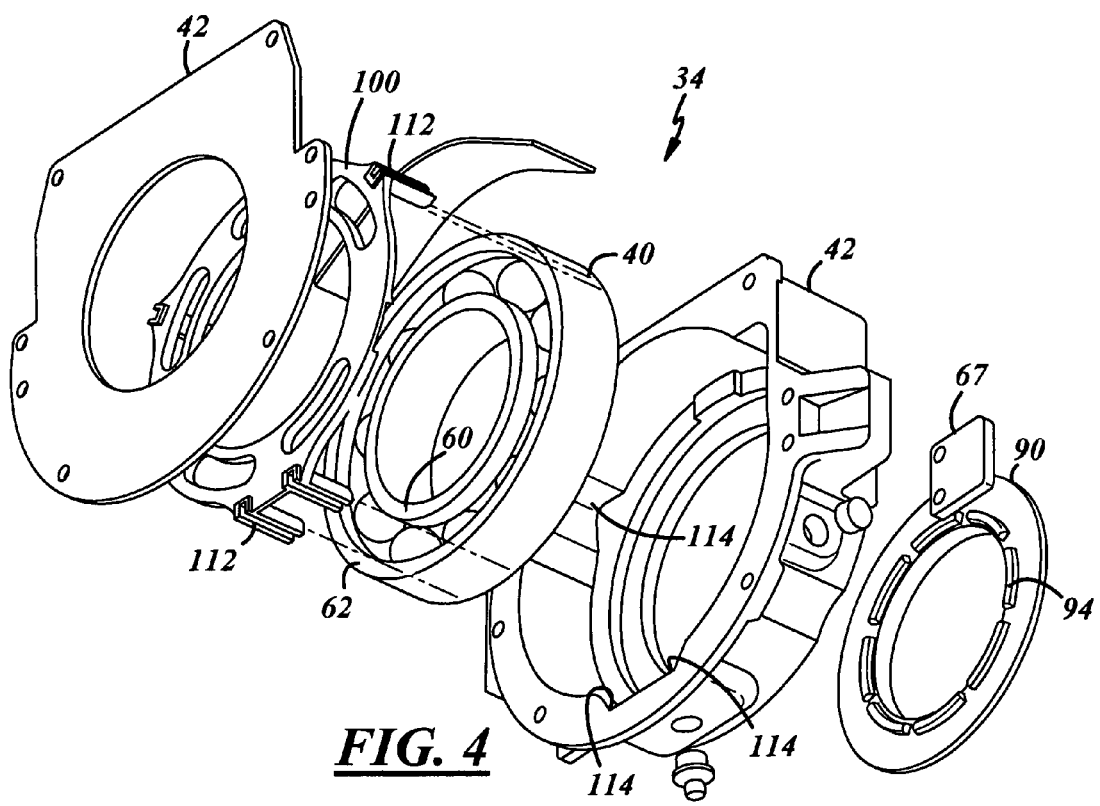
FIG. 4 is a rear exploded view of the release bearing assembly shown in FIG. 1.

An exemplary motor vehicle clutch assembly 10 is shown in FIG. 1. Clutch assembly 10 is, when installed in a vehicle, disposed between a transmission input shaft 12 and an engine crank shaft (not shown). Clutch assembly 10 has an axis of rotation 13 about which clutch assembly 10 and input shaft 12 rotate. A flywheel 14 is configured to be rigidly fixed to the engine crank shaft. A cover 16 is rigidly mounted to flywheel 14. A pressure plate 18 is rotatably fixed to cover 16 by means, such as one or more flexible straps 19, which allow pressure plate 18 to move axially relative to cover 16. A driven disc 20 is axially disposed between pressure plate 18 and flywheel 14.

A retainer 21, encircling a sleeve 36 is engaged by a plurality of apply springs 24 and levers 26. Levers 26 pivotably contact an adjusting mechanism 28 and engage pressure plate 18. Apply springs 24 bias levers 26 against pressure plate 18.

An optional clutch brake 30 is disposed between a feature fixed to or integral with a transmission housing 32 and a clutch release bearing assembly 34. Clutch brake 30 has a disc member rotatably coupled to input shaft 12. When the release bearing assembly 34 is moved against clutch brake 30, the speed of input shaft 12 is gradually halted due to the compressive frictional contact between the disc member and the engaging surfaces of brake 30.

Referring additionally to FIGS. 2-9, release bearing assembly 34 is connected to retainer 21 by retainer sleeve 36 (FIG. 5). A snap ring 37 keeps release bearing assembly 34 on sleeve 36.

Figure 7:
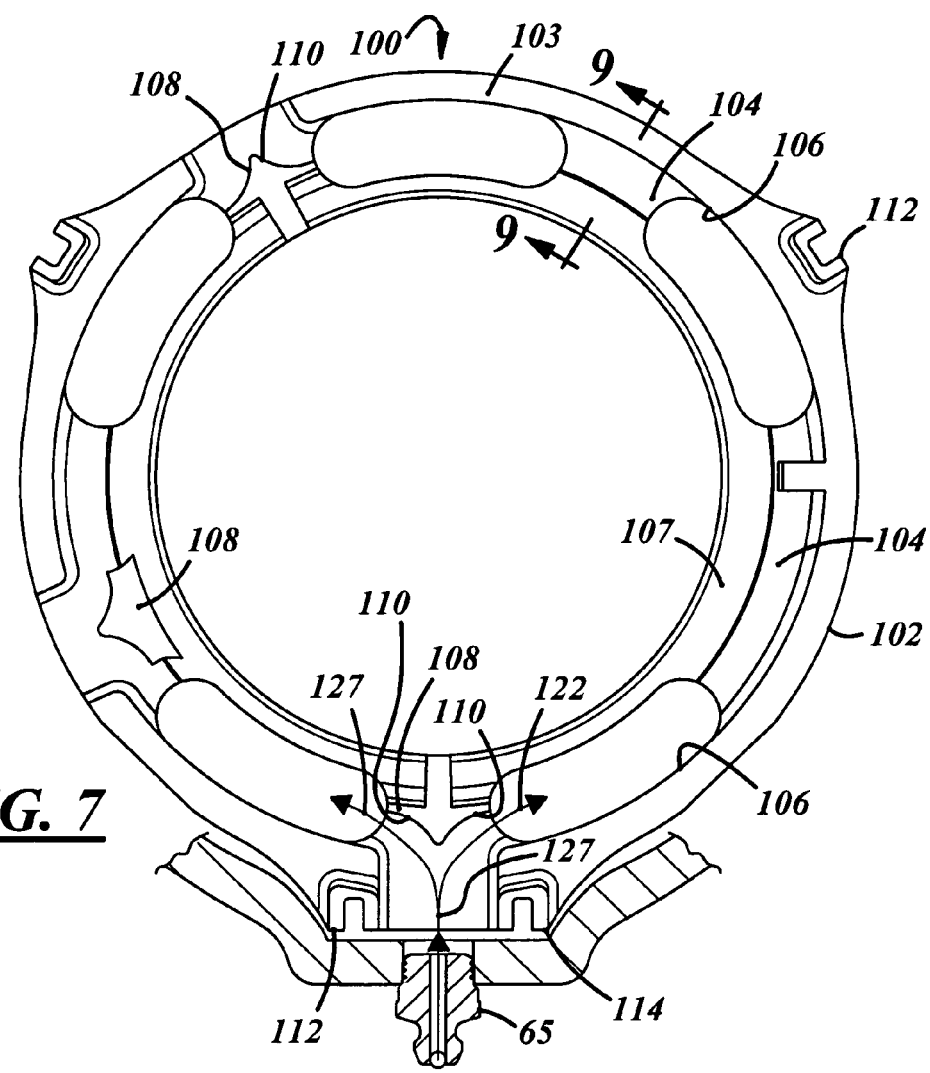
FIG. 7 is a front elevational view of a rear slinger utilized in the release bearing assembly shown in FIG. 5.
Figure 8:
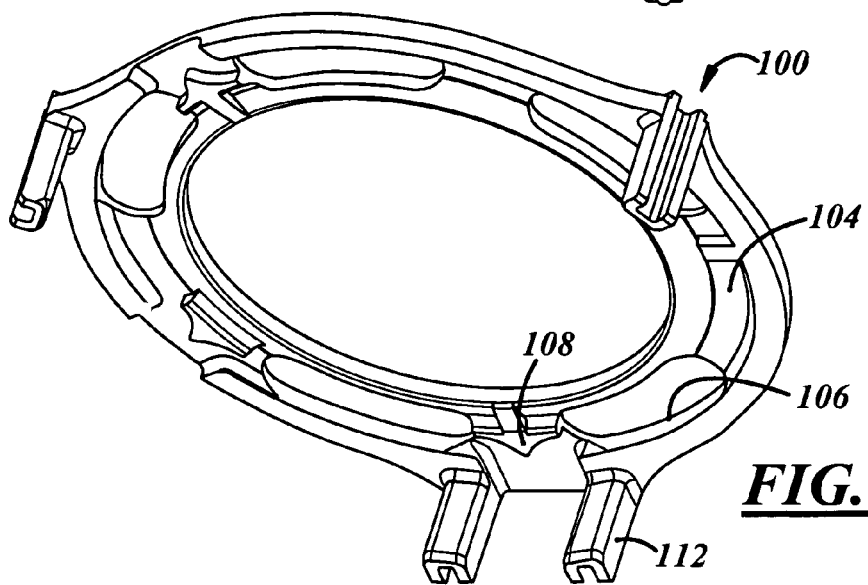
FIG. 8 is a front perspective view of the rear slinger shown in FIG. 7.

Release bearing assembly 34, best shown in FIGS. 5 and 7 includes both a bearing housing 42 and a roller bearing 40 non-rotatively placed therein. Bearing housing 42 has a main body with frontal and rear openings 56, 58 for receipt of the input shaft 12 of the transmission (FIG. 1). A backer plate 44 closes off rear opening 58. Housing 42 has a first flange portion 46 extending radially inwardly over a front end of bearing 40. Bearing housing 42 and backer plate 44 together defines a cavity 54 retaining bearing 40 therein. Housing 42 and backer plate 44 are joined by rivets 53 or other appropriate fastening methods. First flange portion 46 has an axially extending inner diameter edge forming front opening 56. The length of the axial edge can be fairly short, in some cases no longer than the thickness of the housing. A leaf spring 57 is radially disposed between housing 42 and bearing 40, biasing bearing 40 against radially extending portions (not shown) of housing 42 within cavity 54 in a manner well known in the art and described in U.S. Pat. No. 5,947,251.

Roller bearing 40 as shown in FIG. 5 includes an inner race 60, an outer race 62, rollers 64 and a cage (not shown) which helps retain rollers 64. An inner diameter of inner race 60 is sized to receive retainer sleeve 36 and may provide a press-fit relationship with sleeve 36. Grease fittings 65, shown in FIG. 2, may be threaded into a side of bearing housing 42 through an aperture therein. Bearing housing 42 may also have a pair of engagement ears 66, as shown in FIGS. 2 and 3, upon which may be mounted replaceable wear elements for engagement with a clutch fork (not shown).

Front circular opening 56 has a diameter that is larger than an inside diameter of inner race 60 and smaller than an outside diameter of outer race 62. Flange portion 46 is therefore able to retain roller bearing 40 while allowing sleeve 36 to enter cavity 54.

A front slinger 90 is axially biased against inner race 60 by a retainer spring 82. Spring 82 is disposed between front slinger 90 and another thrust plate (FIG. 1) that rest against retainer 21.

The front slinger 90 has a main body portion 92 bordering a periphery of front opening 56. Main body portion 92 has a plurality of spring end reception pockets 91 to receive an end 83 of the spring. Pocket 91 reception of the spring end 83 insures that there is no relative rotation between the spring end 83 and front slinger 90. Main body portion 92 has stud projections 94 (radially aligned with and axially opposite pockets 91) which makes contact with inner race 60 of bearing 40 and rotates therewith. Front slinger 90 also has projecting radially outward from the main body 92 a generally planar extension 96. Planar extension 96 covers a major annular portion of the spacing between the bearing inner 60 and outer 62 races, thereby providing a cover against the influx of debris and also providing a cover which retains grease within the spacing between the inner and outer races of the bearing. Planar extension 96 is spaced axially away from bearing races 60 and 62 by studs 94. The release bearing housing 42 has a step portion 59 which is larger in diameter than the planar extension 96 or opening 56. Accordingly, grease attempting to escape axially forward from roller 64 will have a serpentine or U-shaped path along an inner surface 97 of the planar extension 96 radially outward toward step 59 and then axially forward and radially inward before it can escape out the front opening 56. The front slinger 90 is typically fabricated from a high temperature tolerant fiberglass reinforced nylon material or other suitable alternatives.

In abutting contact on the rear end of the outer race 62 of the bearing is a rear slinger 100. The rear slinger 100 has a main body 102 that is separate from the rear backer 44. The main body 102 has a rim portion 103 connected with a circumferential groove portion 104. Axially intersecting circumferential groove portion 104 and extending there through is a plurality of lubricant reservoirs 106. The groove portion 104 also has diverters 108. Diverters 108 have curvilinear directional surfaces 110. Diverters 108 are aligned generally with the grease fittings 65. Diverters 108 direct the flow of grease along the groove portion 104 to a plurality of reservoirs 106. Rear slinger 100 also has extending almost perpendicular therefrom a series of fingers or posts 112. Post 112 interacts with corner sections 114 of the bearing housing to ensure the orientation of the rear slinger 100 is angularly correct so that diverters 108 are adjacent their respective grease fittings. Additionally, posts 112 are inclined approximately 2-4° from perpendicular to cause the rear slinger 100 to grab onto the outer race 62 of the bearing. Rear slinger 100 is typically fabricated from a high temperature tolerant plastic such as fiber reinforced nylon or other suitable alternatives. Rear slinger 100 has rearward extending stud feet 120 to provide assured spacing with respect to backer plate 44. Rear slinger 100 as mentioned previously has abutting contact with outer race 62 and generally seals off a portion of the annular spacing between the inner and outer races with the exception of the lubricant reservoirs 106 which function to retain grease within the bearing housing generally adjacent to the rollers 6. Rear slinger 100, as mentioned previously, has a grease guiding function. Grease injected through grease fitting 65 (FIG. 5 and FIG. 7 path 127) is directed by diverter 108 into groove portion 104 into the reservoirs 106. The reservoirs 106 are spaced to provide a reservoir of grease adjacent as much as possible to the rollers 64. The directional function of rear slinger 100 directs more grease towards rollers 64 and packs bearing 40 with more grease before grease purges out of the rear bearing assembly during the maintenance operation. Empirical studies have shown approximately 60% more grease input into the release bearing housing before rear purge occurs with use of the rear slinger 100. Additionally, rear slinger 100 takes up a lot of the air space between bearing 40 and backer plate 44. Groove portion 104 has an axially inclined portion 107 to fill as much as possible the space between the rear slinger and the rollers 64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A release bearing assembly for a clutch selectively connecting an engine with a transmission comprising:
    a bearing housing having front and rear openings for receipt of an input shaft of a transmission, said bearing housing having a body mounting at least one grease fitting, and said bearing housing having a generally radially inward extending flange intersected by said front circular opening;
    a bearing with radially spaced apart inner and outer races for placement within said bearing housing, said outer race being engaged by said housing in a non-rotative manner;
    a front slinger having a main body portion bordering a periphery of said bearing housing front opening and a radial extending planar portion at least partially covering an annular portion between said bearing inner and outer races;
    a rear slinger contacting said outer race and forming an annular groove portion adjacent said annular spacing of said inner and outer races, said slinger having at least one reservoir in said groove portion for storage of grease; and
    a backer plate enclosing said rear slinger within said bearing housing.

2. A release bearing assembly as described in claim 1, wherein said rear slinger and said backer plate are separate members.

3. A release bearing assembly as described in claim 1, wherein adjacent said grease fitting said groove portion has a diverter to direct said grease to said reservoir.

4. A release bearing assembly as described in claim 3, wherein said diverter has a curvilinear surface.

5. A release bearing assembly as described in claim 3, wherein said diverter directs grease to multiple reservoirs.

6. A release bearing assembly as described in claim 1, having multiple grease fittings and multiple reservoirs.

7. A release bearing assembly as described in claim 1, wherein said rear slinger has fingers to circumferentially locate said rear slinger within said housing.

8. A release bearing assembly as described in claim 1, wherein said rear slinger has fingers to grip onto said outer race of said bearing.

9. A release bearing assembly as described in claim 1, wherein said groove portion of said rear slinger has an inclined portion to axially take up space adjacent rollers of said bearing.

10. A release bearing assembly as described in claim 1, wherein said rear slinger reservoirs axially extend through said groove portion.

11. A release bearing assembly as described in claim 1, wherein said rear slinger has a foot spacer to insure separation between said slinger groove portion and said backer plate.

12. A release bearing assembly for a clutch selectively connecting an engine with a transmission comprising:
- a bearing housing having a front circular opening and a rear opening for receipt of an input shaft of a transmission, said bearing housing having a body mounting at least one grease fitting, and said bearing housing having a generally radially inward extending flange intersected by said front circular opening and said bearing housing having a step with a diameter greater than a diameter of said front circular opening;
- a bearing with radially spaced apart inner and outer races for placement within said bearing housing, said outer race being engaged by said housing in a non-rotative manner and said outer race having an outer diameter greater than said bearing housing step diameter;
- a front slinger having a main body portion bordering a periphery of said bearing housing front circular opening and a planar radial extension covering a major portion of an annular spacing between said bearing inner and outer races, said slinger having a stud contacting said inner race to axially space said planar radial extension, said planar radial extension having a diameter less than said step diameter;
- a rear slinger contacting said outer race and forming an annular groove portion adjacent said annular spacing of said inner and outer races, said rear slinger having at least one reservoir in said groove portion for storage of grease and adjacent said grease fitting, said groove portion having a diverter directing grease toward said reservoir; and
- a backer plate separate from said rear slinger for enclosing said rear slinger within said bearing housing.

13. A release bearing assembly as described in claim 12, wherein said rear slinger has fingers to circumferentially locate said rear slinger within said housing.

14. A release bearing assembly as described in claim 12, wherein said rear slinger has fingers to grip onto said outer race of said bearing.

15. A rear slinger for a release bearing assembly for a clutch selectively connecting an engine with a transmission, the bearing assembly including a bearing housing having a front circular opening and a rear opening for receipt of an input shaft of a transmission, the bearing housing having a body mounting at least one grease fitting, and the bearing housing having a generally radially inward extending flange, the bearing assembly also having a bearing with radially spaced apart inner and outer races for placement within the bearing housing, the outer race being engaged by the housing in a non-rotative manner, said rear slinger comprising:
- an annular rim portion for contacting said bearing outer race;
- an annular groove connected with said annular rim portion adjacent said annular spacing of the inner and outer races, said rear slinger having at least one reservoir in said groove portion for storage of grease;
- wherein adjacent said grease fitting said groove portion has a diverter to direct the grease to said reservoir; and
- wherein said rear slinger has fingers to grip onto the bearing outer race and the fingers circumferentially locate said rear slinger with the bearing housing.

16. A front slinger for a release bearing assembly for a clutch selectively connecting an engine with a transmission, the bearing assembly including a bearing housing having a frontal circular opening and a rear opening for receipt of an input shaft of a transmission, the bearing housing having a body mounting at least one grease fitting, and the bearing housing having a generally radially inward extending flange intercepted by the frontal circular opening, and the bearing housing also having a step with a diameter greater than a diameter of the frontal circular opening, a bearing with radially spaced apart inner and outer races placed within the bearing housing, the outer race being engaged by the housing in a non-rotative manner, and the outer race having an outer diameter greater than a diameter of the step, said front slinger comprising:
- a main body portion bordering the frontal circular opening and contacting the inner race of the bearing;
- a generally planar extension for covering a major portion of the annular spacing between said bearing inner and outer races;
- stud projections connected with said main body portion, said stud projections axially spacing said planar extension away from said inner and outer races; and;
- wherein said front slinger main body has a series of spring reception pockets radially aligned and axially opposite said stud projections.

* * * * *